(12) United States Patent
Nakano et al.

(10) Patent No.: US 7,819,384 B2
(45) Date of Patent: Oct. 26, 2010

(54) GATE VALVE DEVICE

(75) Inventors: Kiyoharu Nakano, Osaka (JP);
Haruhiko Shimizu, Osaka (JP);
Hisakazu Asai, Osaka (JP)

(73) Assignee: Waterworks Technology Development Organization, Osaka (JP)

( * ) Notice: Subject to any disclaimer, the term of this patent is extended or adjusted under 35 U.S.C. 154(b) by 289 days.

(21) Appl. No.: 12/063,344

(22) PCT Filed: Aug. 7, 2006

(86) PCT No.: PCT/JP2006/315589

§ 371 (c)(1),
(2), (4) Date: Feb. 8, 2008

(87) PCT Pub. No.: WO2007/018172

PCT Pub. Date: Feb. 15, 2007

(65) Prior Publication Data

US 2009/0224197 A1 Sep. 10, 2009

(30) Foreign Application Priority Data

Aug. 10, 2005 (JP) .............................. 2005-231677

(51) Int. Cl.
*F16K 25/00* (2006.01)
(52) U.S. Cl. .................. 251/204; 251/193; 251/326
(58) Field of Classification Search .......... 251/193, 251/203, 204, 326
See application file for complete search history.

(56) References Cited

U.S. PATENT DOCUMENTS 6,283,446 B1 * 9/2001 Sato et al. .................. 251/193
6,893,001 B2 * 5/2005 Maenishi .................. 251/193
7,073,776 B2 * 7/2006 Mori .......................... 251/334
2003/0222237 A1 12/2003 Maenishi

FOREIGN PATENT DOCUMENTS

| FR | 2 536 496 A1 | 5/1984 |
| JP | 59-81857 | 6/1984 |
| JP | 61-73891 | 5/1986 |
| JP | 7-167314 | 7/1995 |
| JP | 2003-343748 A | 12/2003 |

OTHER PUBLICATIONS

Office Action issued by Japanese Patent Office dated Jun. 24, 2010 for counterpart Japanese Patent Application No. 2005-231677.

* cited by examiner

*Primary Examiner*—John K Fristoe, Jr.
(74) *Attorney, Agent, or Firm*—Knobbe Martens Olson & Bear LLP

(57) ABSTRACT

A movable member is fitted in the middle in the vertical direction of a valve body core fitting that forms a gate valve body, and the movable member presses an elastic seal member from the inside of the seal member toward a tube inner wall surface located in a direction crossing the direction of insertion of the seal member. The movable member has arms and contact sections. The arms each have a second inclined section for pressing the elastic seal member against the tube inner wall surface upon receiving pressing action from a first inclined section that is formed on a pressing member and changes the direction of pressing. The contact sections are in contact with and press the inside of the elastic seal member. The contact sections of the movable member have recesses having inside the elastic seal member.

12 Claims, 5 Drawing Sheets

GATE VALVE DEVICE

This application is the U.S. National Phase under 35 U.S.C. §371 of International Application PCT/JP2006/315589, filed Aug. 7, 2006, which claims priority to Japanese Patent Application No. 2005-231677, filed Aug. 10, 2005. The International Application was published under PCT Article 21(2) in a language other than English.

TECHNICAL FIELD

The present invention relates to a gate valve device and, more particularly, to a gate valve device having a case member which can be attached to a pipe and a gate valve body which is disposed in the case member and can be inserted from a hole formed in a peripheral wall of the pipe into the pipe.

BACKGROUND ART

In the case such that a construction work of a public water supply pipe is executed, a method is employed that without stopping water on the upstream side, passage of water in the pipe is temporarily stopped by using a gate valve device as a non-water-stop pipe water stopping device while maintaining a water passing state, and a construction work is performed on the downstream side. After completion of the construction work, the water stop state is cancelled.

Conventionally, the volume of a rubber lining in a valve body used as the non-water-stop pipe water stopping device tends to be large. The reason is that since the valve body of a pipe water stopping device is inserted in a buried pipe through which water is passing to stop water, positioning between a bore hole and the valve is necessary at a site. To reliably interrupt the flow of water, the volume of the rubber lining has to be large. That is, stopping of water in a pipe depends on elasticity of the rubber lining.

Pipes in which the no-water-stop pipe water stopping device is installed include a pipe buried and used for long time and a relatively new pipe and the like. The inside diameters of pipes having the same outside diameter are usually different from each other according to the kinds of the pipes. As a result, the volume of the rubber lining has to be increased to enhance the cutoff performance.

To reliably stop water in a pipe at a site, the following conditions have to be satisfied, and the balance has to be adjusted.

(1) The compression force of the rubber lining in the bottom of a valve body and the bottom of the inner face of the pipe is allowed to act.

(2) The compression force of the rubber lining on the side face of the valve body and the side face in the pipe is allowed to act.

(3) The bore hole is closed by an upper part of the valve body.

The conditions (1) and (2) can be satisfied to some extent by increasing the volume of the rubber lining. However, the deformation amount of the valve body increases at the time of cutting off the valve body, and the torque necessary for cutoff since the valve body comes into contact with the pipe bottom until water completely stops tends to increase. When the deformation amount is large, it is difficult to obtain sufficient compressibility with the pipe inner face, so that sufficient cutoff performance cannot be obtained. Consequently, there is a problem such that when the opening/closing operations are repeated, the rubber lining is damaged by the bore hole.

The condition (3) requires to close the bore hole after reliably closing the pipe under the conditions (1) and (2). When the bore hole is closed first, a flange part of the rubber lining comes into contact with the bore hole, the cutoff torque increases, and compression of the valve body rubber lining with the pipe inner face is not transferred. As a result, when the cutoff is further increased, a problem occurs that the rubber lining is damaged by the bore hole.

As described above, the balance among the conditions (1) to (3) has to be adjusted for existing pipes having different inside diameters. For this purpose, a non-water-stop pipe water stopping device having higher cutoff performance is in demand.

The applicant of the present invention has developed the gate valve device disclosed in Patent Document 1. The gate valve device has a spindle and a valve rod to be inserted as a drive shaft into a pipe, and also a movable piece for pressing a seal member against the inner wall of the pipe, so that water can be sufficiently stopped. Moreover, the size in the vertical direction can be made smaller than that of a conventional device (for example, Patent Document 1).

Patent Document 1: Japanese Unexamined Patent Application Publication No. 2003-343748

DISCLOSURE OF THE INVENTION

Problems to be Solved by the Invention

However, the conventional gate valve device has a number of parts and its structure is complicated and consequently has a problem of high manufacturing cost. Since pipes having the same outside diameter have different inside diameters according to the kinds of pipes, a gate valve device having a valve body corresponding to the pipe kind has to be prepared and it is uneconomical.

An object of the present invention is to provide a gate valve device having a single valve body which can be adapted to various existing pipes having different inner diameters and having high cutoff performance while realizing low manufacturing cost.

Means for Solving the Problems

The object is achieved by the inventions described in claims. Specifically, as a characteristic configuration of a gate valve device according to the present invention, the gate valve device has a case member which can be attached to a pipe and a gate valve body disposed in the case member and capable of being inserted in the pipe from a hole formed in a peripheral face of the pipe. The gate valve body includes a valve body core fitting, an elastic seal member covering the valve body core fitting, a press member which presses the elastic seal member from the insertion direction to be elastically deformed, when the elastic seal member is inserted in the pipe, a drive shaft formed in a rod shape along the insertion direction to move the press member along the insertion direction, and a movable member fitted in the middle in the vertical direction of the valve body core fitting and pressing, from the inside, the elastic seal member against an inner wall face of the pipe in a cross direction crossing the insertion direction. The movable member is comprised of: an arm having a second inclined section receiving a pressing action from a first inclined section for converting a pressing direction, formed in the press member and pressing the elastic seal member against the inner wall face of the pipe; and a contact section which comes into contact with the inside of the elastic seal member to press the inside. A recess having the elastic seal member on its inner side is formed in the contact section in the movable member.

With the configuration, when the movable member acts to press the elastic seal member in the swelling direction as the press member descends in any of pipes having the same outside diameter and different inside diameters, the elastic seal member existing in the recess in the contact section is effectively pushed and fed, so that the water stopping action can be displayed reliably. However, a complicated structure having a number of parts is not required. Moreover, the clamping torque at the time of stopping water is smaller than that in the conventional technique, so that the water stopping work can be made easier.

As a result, the gate valve device which can be adapted, with a single valve body, to various existing pipes having different inside diameters, having high cutoff performance, and realizing low manufacturing cost can be provided.

Preferably, the recess formed in the contact section in the movable member is formed in a groove shape extending in the vertical direction of the contact section, and has an opening angle at which a cross section of the recess widens toward the inner face of the pipe.

With the configuration, the capacitance of the elastic seal member which is pressed and fed by the movable member can be increased. Thus, water can be stopped by performing the sealing operation more effectively also on existing pipes having different inside diameters.

Figure 1:
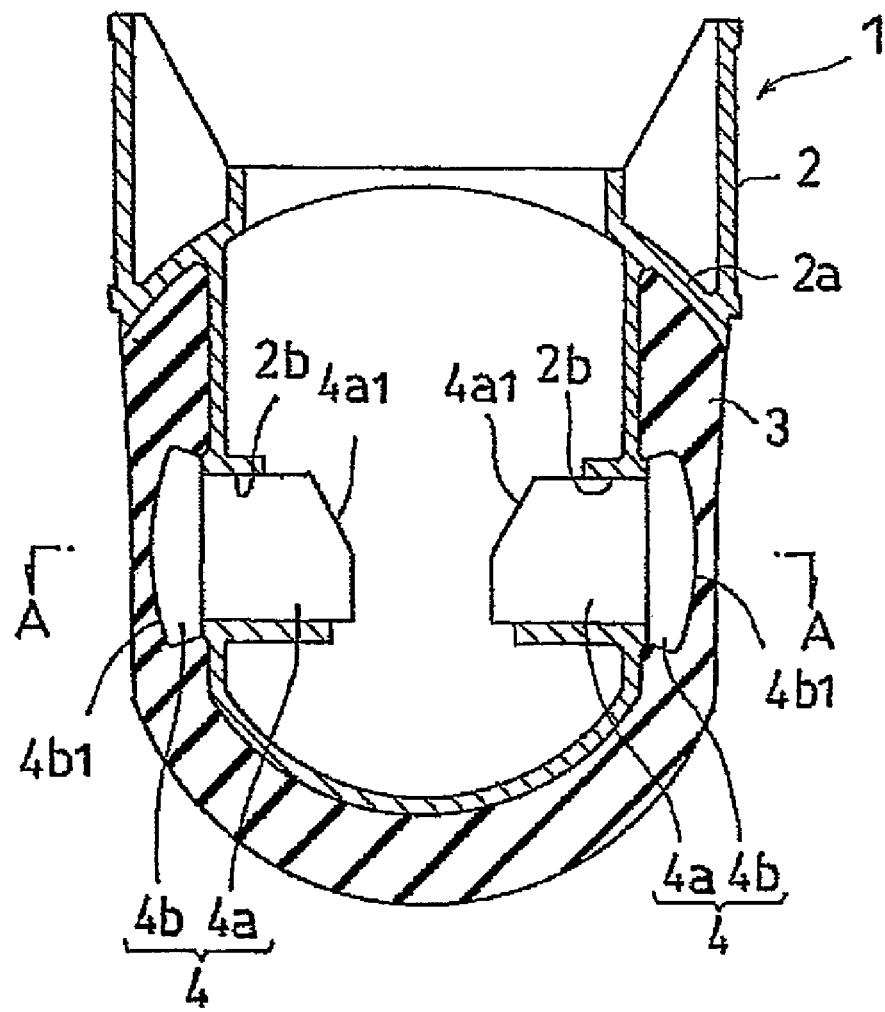
FIG. 1 is a longitudinal section of a main part of a gate valve body as a component of a gate valve device as an embodiment of the present invention.

DESCRIPTION OF REFERENCE NUMERALS 1 gate valve body
2 valve body core fitting
3 elastic seal member
4 movable member
4a arm
4a1 second inclined section
4b contact section
4b2 recess
5 press member
5a first inclined section
6 drive shaft
11, 12, 13 case members
K pipe
θ opening angle

BEST MODE FOR CARRYING OUT THE INVENTION

Figure 2:
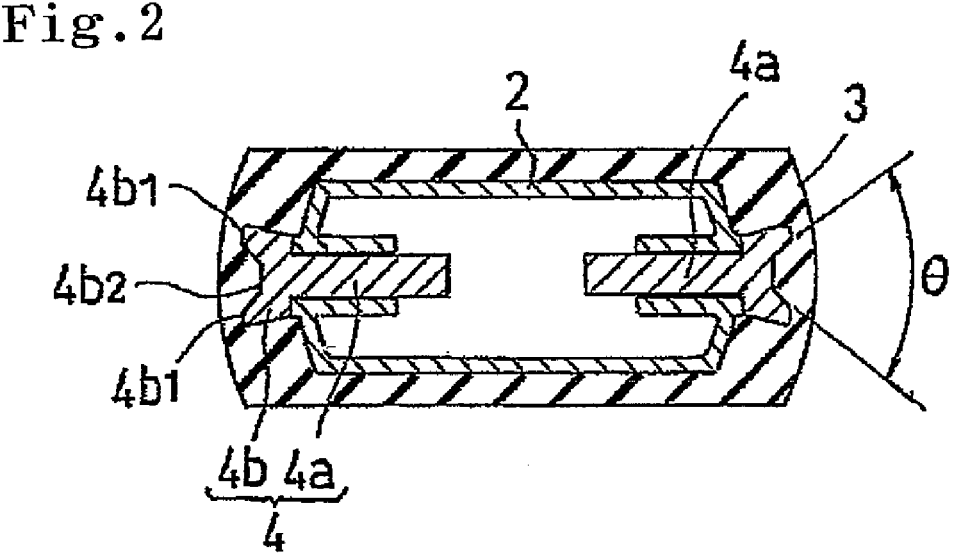
FIG. 2 is a cross section taken along A-A line of FIG. 1.

An embodiment of a gate valve device according to the present invention will be described in detail with reference to the drawings. FIG. 1 shows the structure in a longitudinal section of a main part of a gate valve body (hereinafter, called valve body) 1 as a component of a gate valve device according to the embodiment. FIG. 2 shows the structure in a cross section taken along line A-A of FIG. 1. FIGS. 3 to 9 are longitudinal sections showing processes of attaching the gate valve device to an existing pipe.

Figure 3:
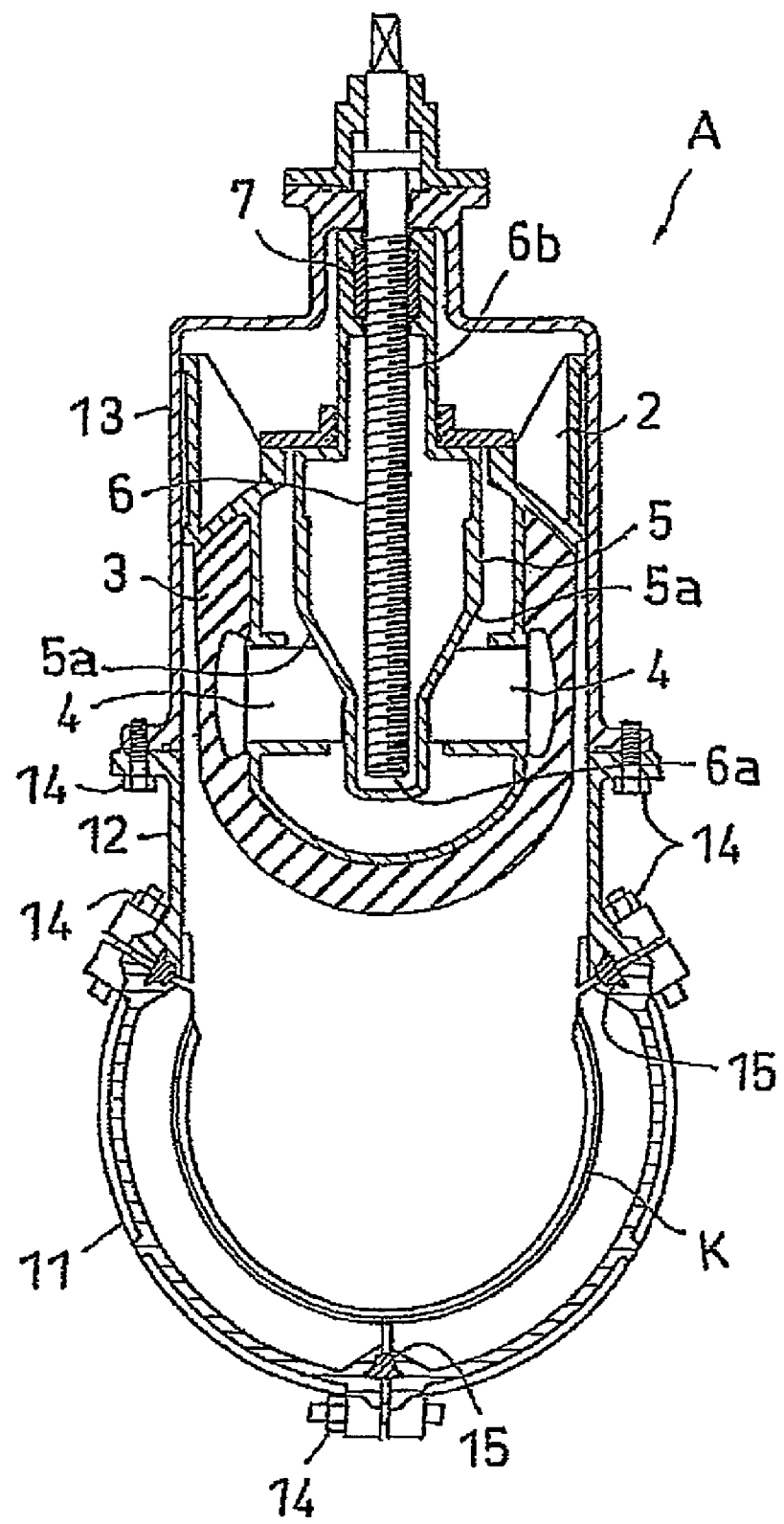
FIG. 3 is a longitudinal section showing a process of stopping water by attaching the gate valve device to an existing pipe K.

The valve body 1 has a valve body core fitting 2, a rubber lining 3 as an elastic seal member covering a portion in which the valve body core fitting 2 is in contact with water in the pipe, a slide spindle 5 as a press member, when the rubber lining 3 is inserted into the pipe K as shown in FIG. 3, for pressing the rubber lining 3 from the insertion direction to be elastically deformed, and a drive shaft 6 formed in a rod shape along the insertion direction so as to move the slide spindle 5 along the insertion direction.

The valve body 1 has a structure that the rubber lining 3 covers the portion downward of a flange 2a of the valve body core fitting 2 that extends in a circumferential shape along the outer periphery of the pipe K. The flange 2a of the valve body core fitting 2 has a function of preventing the rubber lining 3 from being deformed upwardly of the flange 2a so that the rubber lining 3 is not deformed and pushed off when the rubber lining 3 is in contact with a pipe and is pressed.

Two right and left openings 2b in which a pair of right and left movable pieces 4 as a pair of right and left movable members are formed in the middle in the vertical direction of the valve body core fitting 2. The movable piece 4 is comprised of an arm 4a and a contact section 4b. The contact section 4b supports the rubber lining 3 and its outer peripheral face 4b1 is in contact with the inside of the rubber lining 3. As will be described later, when the slide spindle 5 is inserted from above into the valve body 1, a first inclined section 5a for converting the press direction, which is formed in the slide spindle 5, comes into contact with an inclined face 4a1 as a second inclined portion formed at one end of the arm 4a of the movable piece 4. As the slide spindle 5 descends, the right and left movable pieces 4 press the rubber lining 3 to make the rubber lining 3 swell in the direction crossing the insertion direction.

The outer peripheral face 4b1 of the contact section 4b of the movable piece 4 which comes into contact with the rubber lining 3 is formed in a circular-arc-shaped curved surface shape so that its vertical portion having an area as large as possible can uniformly come into contact with the inner side of the pipe. FIG. 2 shows the structure in a section taken along line A-A. The front end of the contact section 4b is forked into two directions having an opening angle θ so that the tips are widened. The rubber lining 3 enters a recess 4b2 extending in the vertical direction. In this case, the opening angle θ is preferably about 50 to 100° and, more preferably, 60 to 90°. When the opening angle θ is smaller than the range, the amount of the rubber lining 3 in the recess 4b2 is small and it is unpreferable. When the opening angle θ is larger than the range, the torque of pressing the slide spindle 5 is large and it is unpreferable.

The inner face of the recess 4b2 is formed in a curved face shape. The inner face in the vertical direction has a circular arc shape almost parallel with the outer peripheral face 4b1 of the contact section 4b. As a result, the recess 4b2 is formed in a groove shape extending in the vertical direction of the contact section 4b and has the opening angle θ at which its cross section extends toward the pipe inner face.

Further, the front end of the contact section 4b is formed in a curved shape. When the rubber lining 3 is pressed against the inner wall of the pipe, the rubber lining portion in the recess 4b2 can be smoothly pushed without damaging the rubber lining 3. Since the contact section 4b is formed in such a shape, when the movable piece 4 presses the rubber lining 3 in the swelling direction as the slide spindle 5 descends in any of pipes K having the same outside diameter and different inside diameters, the rubber lining 3 in the recess 4b2 between the contact sections 4 forked in two directions is effectively pushed. Consequently, even when an existing pipe whose inner diameter is larger than assumed from the outside diameter is used, the rubber lining 3 is extended and the water stopping action is reliably displayed. Therefore, even when the user encounters an existing pipe having an unexpected inside diameter at a construction site, the user can flexibly handle it. Moreover, the action force of the movable piece 4 to press the elastic rubber lining 3 in the swelling direction is sufficient. Therefore, a clamping toque at the time of stopping water is smaller than that in the conventional technique, so that the water stopping work is easier.

The rubber lining 3 is integrally attached so as to cover a lower part of the flange 2a of the valve body core fitting 2, and its bottom portion is formed in a circular arc shape so as to be along the inner face of the pipe. The width of the rubber lining 3 is slightly smaller than the inner diameter of the pipe, so that the valve body 1 can be smoothly inserted in a pipe.

Referring now to FIGS. 3 to 9, a process of stopping water by attaching the gate valve device including the valve body 1 to the existing pipe K will be described.

First, a gate valve device A is attached to the pipe K. After that, with a rotating hole saw (not shown) having the outside diameter of 92 to 100% of the inner diameter of the pipe K, a hole is opened in the pipe K. In this case, when the outside diameter of the hole saw is larger than the inside diameter of the pipe K, there is the possibility that a step is formed in the inner face of the pipe at the end of the hole opening operation and the water stopping performance of the valve deteriorates. When the outside diameter of the hole saw is less than 92% of the inside diameter of the pipe K, at the time of stopping water with the valve body 1, it becomes necessary to largely deform the rubber lining, and the water stopping performance becomes unstable.

FIG. 3 shows the structure in a longitudinal section of a state, viewed from the pipe axis direction, in which the hole opening operation with the hole saw is finished, the hole saw is pulled up, the gate valve device A of the embodiment is attached to the existing water pipe K, and the valve body 1 is going to be inserted in the pipe.

The gate valve device A has a lower case member 11 which are halved, an intermediate case member 12, and an upper case member 13. When the case members 11, 12, and 13 are attached to the existing pipe K, the case members 11, 12, and 13 are fixed to each other by fixing mechanisms 14 of bolts and nuts. Between the neighboring case members 11, 12, and 13, a packing 15 is inserted, thereby obtaining a watertight structure.

On the inside of the case members 11, 12, and 13, the valve body 1 is disposed. The inner face of the lower end of the valve body 1 is in contact with a lower end 6a of a valve rod 6 as the drive shaft. By a rotation descending operation of the valve rod 6 via a screw 7, the valve body 1 is inserted downward, that is, into the pipe K. The upper end 6a of the valve rod 6 can be manually or automatically rotated via a rotation jig (not shown). When the valve rod 6 is rotated, the valve body 1 can move in the vertical directions by the screw action of the screw 7 formed in an upper part of an almost center of the valve body 1 and a male screw 6b formed in the valve rod 6.

Figure 4:
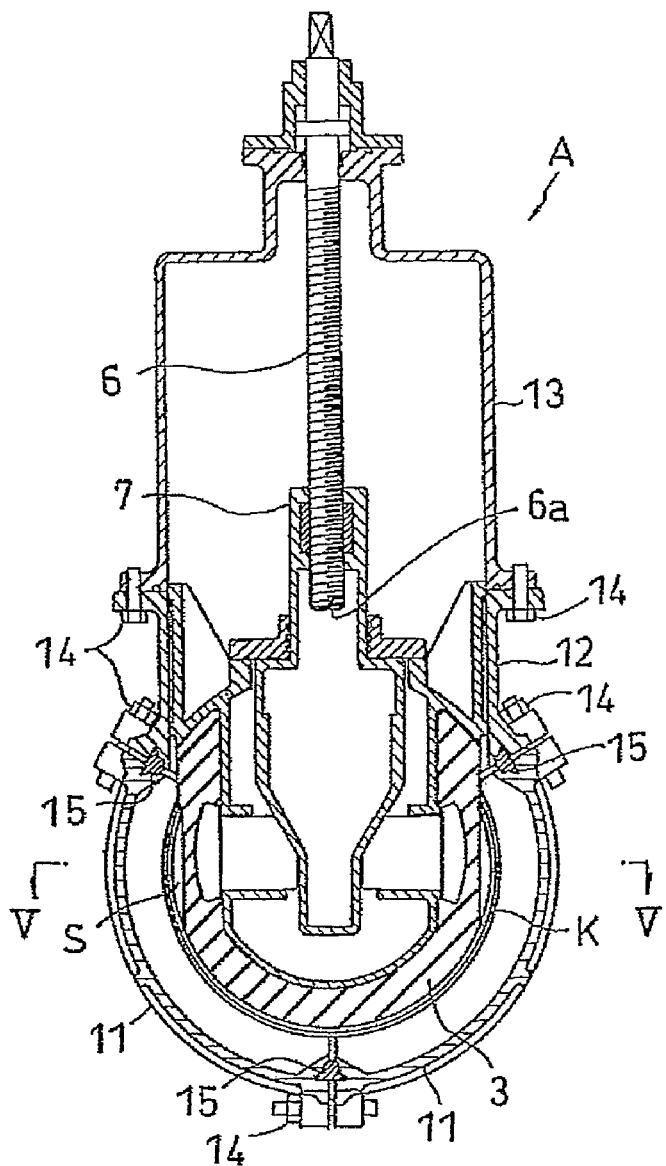
FIG. 4 is a longitudinal section showing a process of stopping water by attaching the gate valve device to an existing pipe K.
Figure 5:
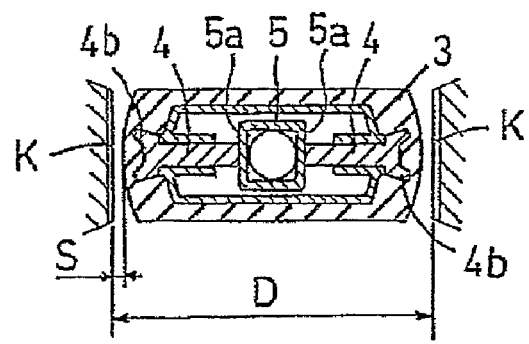
FIG. 5 is a cross section taken along line V-V of FIG. 4.

FIG. 4 shows a state where the valve body 1 descends into the pipe K by the rotation jig and reaches the bottom of the pipe K. In this case, as shown in FIG. 5 illustrating the structure in the section taken along line V-V of FIG. 4, the movable piece 4 does not act on the rubber lining 3, so that the rubber lining 3 faces the inner diameter D of the pipe K via a gap S.

Figure 6:
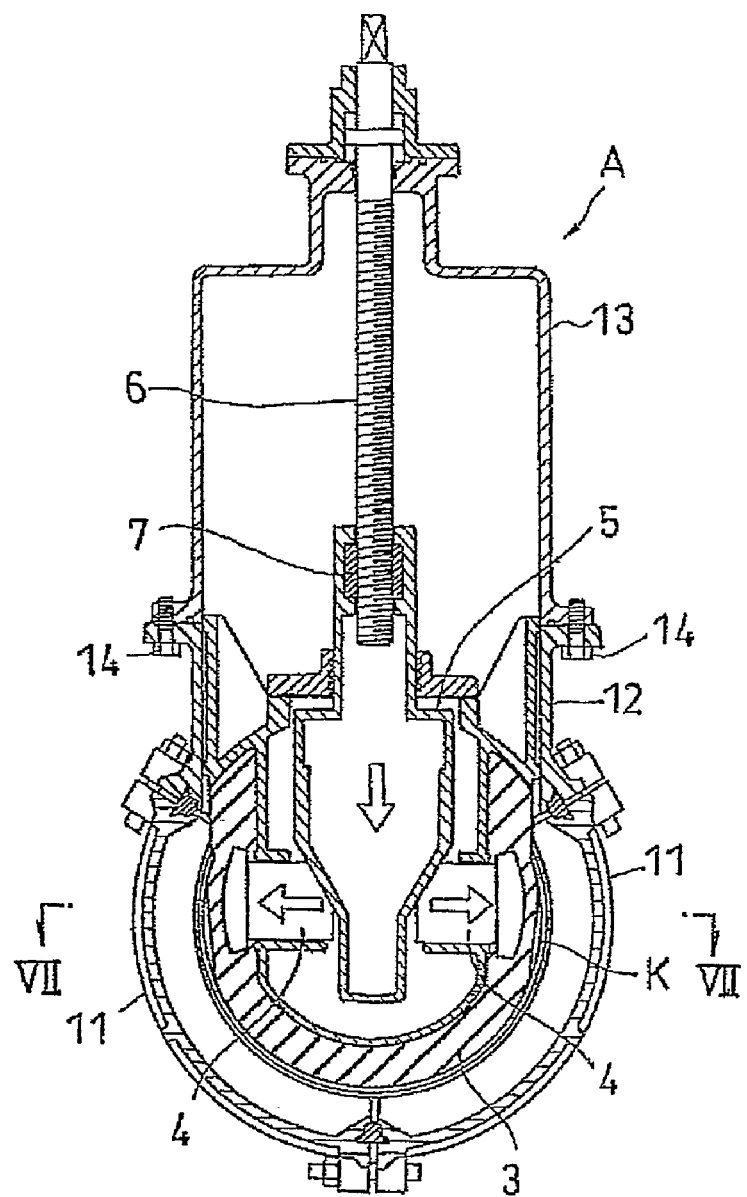
FIG. 6 is a longitudinal section showing a process of stopping water by attaching the gate valve device to an existing pipe K.
Figure 7:
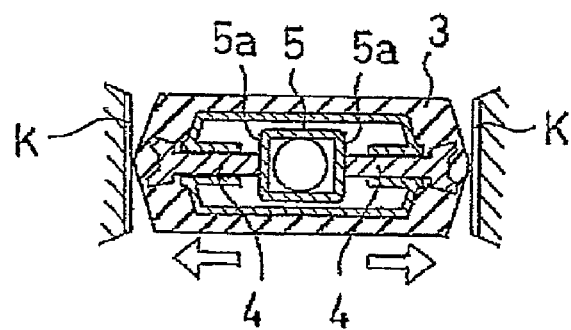
FIG. 7 is a cross section taken along line VII-VII of FIG. 6.

When the valve rod 6 is rotated, as shown in FIG. 6, the slide spindle 5 starts descending via the screw 7 and, as described above, the first inclined section 5a of the slide spindle 5 comes into contact with an inclined face 4a1 of the arm 4a of the movable piece 4. As the spindle 5 descends, the right and left movable pieces 4 make the rubber lining 3 swollen in the crossing direction shown by the arrows, which cross the insertion direction, the rubber lining 3 comes into contact with the peripheral face in the pipe, and the gap S disappears. The state is also illustrated in FIG. 7 showing the structure in cross section taken along line VII-VII of FIG. 6.

Figure 8:
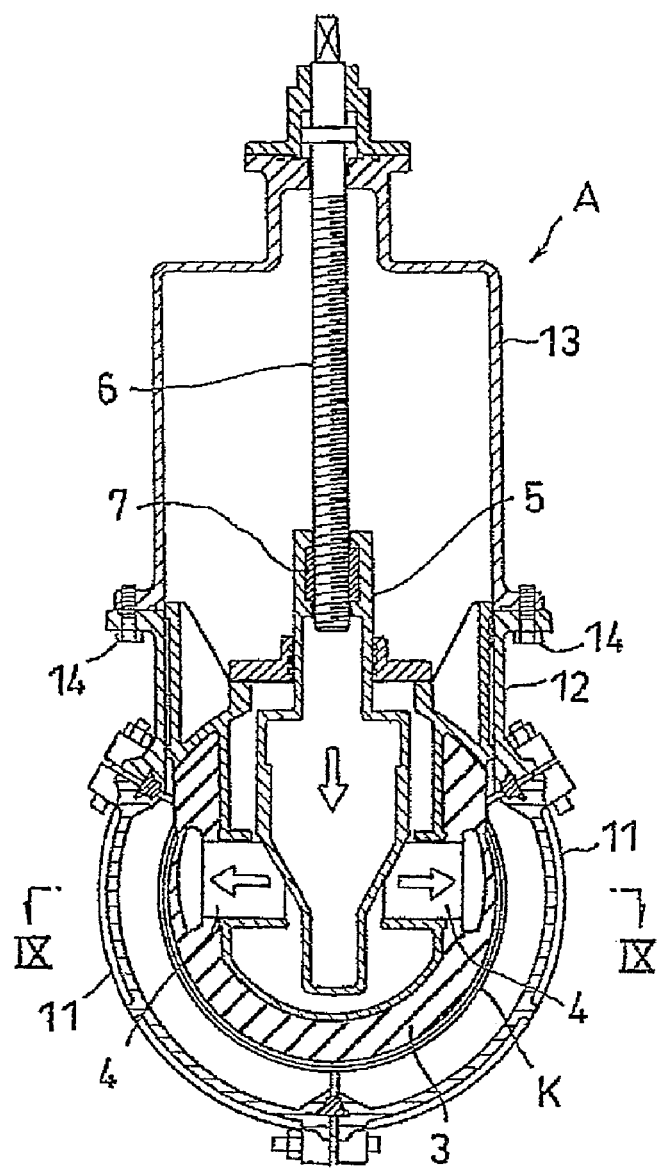
FIG. 8 is a longitudinal section showing a process of stopping water by attaching the gate valve device to an existing pipe K.
Figure 9:
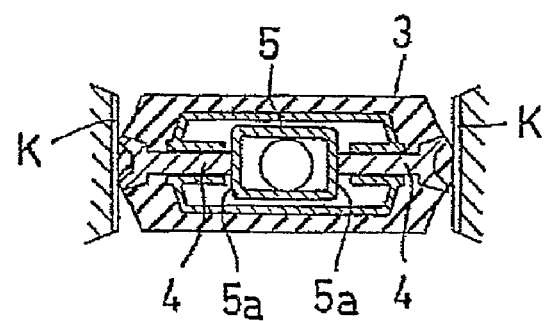
FIG. 9 is a cross section taken along line IX-IX of FIG. 8.

By further rotating the valve rod 6, as shown in FIG. 8, the slide spindle 5 descends. Until the swollen rubber lining 3 presses the inner face of the pipe K and is compressed, the right and left movable pieces 4 move in the swelling direction. As shown in FIG. 9 illustrating the structure in cross section taken along line IX-IX of FIG. 8, the rubber lining 3 is strongly compressed against the inner peripheral face of the pipe K, so that water can be stopped reliably. In this case, as compared with the conventional technique, the capacity of the rubber lining 3 which is fed when the movable members 4 presses the rubber lining 3 is larger. Consequently, existing pipes having different inner diameters are effectively sealed and an effect capable of stopping water is displayed.

Other Embodiment (1) In the foregoing embodiment, the recess 4b2 is formed in a groove shape extending in the vertical direction of the contact section 4b, and its sectional face has the opening angle θ at which the recess 4b2 widens toward the pipe inner face. However, the shape of the recess is not limited to the shape, but may be a shape in which the elastic seal member is held to some extent on the inside of the contact section.

The invention claimed is:

1. A gate valve device having a case member which can be attached to a pipe and a gate valve body disposed in the case member and capable of being inserted in the pipe from a hole formed in a peripheral face of the pipe, wherein the gate valve body comprises a valve body core fitting, an elastic seal member covering the valve body core fitting, a press member which presses the elastic seal member from the insertion direction to be elastically deformed, when the elastic seal member is inserted in the pipe, a drive shaft formed in a rod shape along the insertion direction to move the press member along the insertion direction, and a movable member fitted in the middle in the vertical direction of the valve body core fitting and pressing, from the inside, the elastic seal member against an inner wall face of the pipe in a cross direction crossing the insertion direction, the movable member is comprised of an arm having a second inclined section receiving a pressing action from a first inclined section for converting a pressing direction, formed in the press member and pressing the elastic seal member against the inner wall face of the pipe, and a contact section which comes into contact with the inside of the elastic seal member to press the inside, and a recess having the elastic seal member on its inner side is formed in the contact section in the movable member.

2. The gate valve device according to claim 1, wherein the recess formed in the contact section in the movable member is formed in a groove shape extending in the vertical direction of the contact section, and has an opening angle at which a cross section of the recess widens toward the inner face of the pipe.

3. A gate valve device for stopping water flow in a pipe comprising:

a case member being configured to be attached to the pipe;

a gate valve body being movably disposed in the case member, said gate valve body being configured to be inserted in the pipe through a hole formed in a peripheral surface of the pipe, said gate valve body comprising:

a valve core body;

an elastic seal member being disposed on an outer surface of the valve core body;

a pressing member being movable in an insertion direction and having a first tapered portion for transferring pressing force to a direction perpendicular to the insertion direction, said pressing member being configured to apply the pressing force against an inner surface of the pipe;

a drive shaft formed in a rod shape along the insertion direction to move the pressing member in the insertion direction; and a movable member disposed between the pressing member and the elastic seal member, said movable member being movable in the direction perpendicular to the insertion direction to press the elastic seal member against the inner surface of the pipe, said movable member comprising:

an arm having a second tapered portion for receiving pressing force from the first tapered portion for transferring the pressing force to a direction perpendicular to the insertion direction; and a contact section being disposed between the arm and the elastic seal member, said contact section having a recess portion on a surface that contacts the elastic seal member.

4. The gate valve device according to claim 3, wherein the recess portion is a single groove extending parallel to the insertion direction and has an opening thereof toward the inner surface of the pipe.

5. The gate valve device according to claim 3, further comprising a flange on the valve core body, said flange being configured to prevent the elastic seal member from being deformed and compromising tight seal between the pipe and the gate valve.

6. The gate valve device according to claim 4, wherein the groove has a V-shape and an opening angle thereof is 50-100°.

7. The gate valve device according to claim 4, wherein the groove has a V-shape and an opening angle thereof is 60-90°.

8. The gate valve device according to claim 3, wherein the contact section has a front end where the front end contacts the elastic seal member, said front end being formed in a curved shape.

9. The gate valve device according to claim 3, wherein the elastic seal member has a portion being formed in a circular arc shape.

10. The gate valve device according to claim 3, further comprising a holding member for securely connecting the pipe and the gate valve device.

11. The gate valve device according to claim 3, wherein the pressing member is movable in the insertion direction by rotating motion of the drive shaft.

12. The gate valve device according to claim 3, wherein the movable member is arranged symmetrically on each side of the pressing member.

* * * * *